May 11, 1965 G. ROSEN Re. 25,776

MARINE PROPELLER

Original Filed April 20, 1962

INVENTOR
GEORGE ROSEN
BY Harris G. Luther
ATTORNEY

United States Patent Office

Re. 25,776
Reissued May 11, 1965

25,776
MARINE PROPELLER

George Rosen, West Hartford, Conn., assignor to United Aircraft Corporation, East Hartford, Conn., a corporation of Delaware Original No. 3,082,827, dated Mar. 26, 1963, Ser. No. 189,134, Apr. 20, 1962. Application for reissue Aug. 18, 1964, Ser. No. 402,675
25 Claims. (Cl. 170—135.24)

Matter enclosed in heavy brackets [ ] appears in the original patent but forms no part of this reissue specification; matter printed in italics indicates the additions made by reissue.

This invention relates to a high speed marine propeller particularly to the supercavitating type.

An object of this invention is a propeller construction providing the optimum hydrodynamic shape for supercavitating propellers over the complete operating speed range of the propelled vehicle.

A further object is a propeller construction matching a controllable pitch and a fixed pitch pair of blade elements to provide the optimum hydrodynamic shape for a supercavitating marine propeller blade.

A further object is a marine supercavitating propeller construction having a main blade portion pivotally mounted in a hub for pitch changing movement and a fixed auxiliary blade portion supported by said hub nesting with, and extending forward from the trailing edge of said main portion for less than half the chord of the main portion.

Other objects and advantages will be apparent from the following specification and the accompanying drawings in which.

Figure 1:
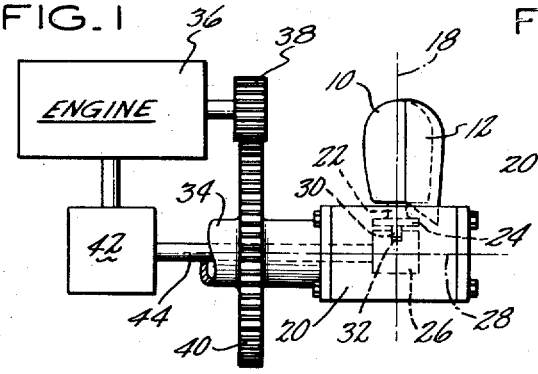
FIG. 1 is a side elevation of a propeller incorporating the invention.

Refinements in hydrodynamic design and the development of marine powerplants with substantial improvements in specific weight have advanced the speed potential of marine vehicles several fold. This trend of increasing ship speeds has, however, introduced a number of problems in the design of effective marine propellers, which, unless adequately solved, could seriously inhibit the development of practical high-speed ships and other water-borne vehicles.

It has been recognized that, with increasing range of ship speeds, there is growing need for controllable pitch (or at least variable pitch) marine propellers to avoid the substantial limitations on engine power output inherent with the fixed pitch propeller. Also, there are the added benefits of improved propeller efficiency at off-design conditions and the ability to provide reverse thrust without the complexity of sudden reversing the direction of propeller rotation.

Controllable pitch does not, however, solve the propeller cavitation problem with its associated adverse effects on performance, noise and blade erosion. At the higher vehicle speeds, the propeller, with its added rotative speed, experiences cavitation sooner than any other component of the vehicle, and it has become evident that suppression of propeller cavitation becomes impossible at speeds above 40–50 knots, even if the propulsion unit is lightly loaded. Consequently, there has been active interest in the application of supercavitating foils to marine propellers as a means of alleviating cavitational losses. However the consideration of a controllable pitch, supercavitating marine propeller presents several difficult and conflicting design problems. These stem principally from the radical shape of the supercavitating foil.

For effective supercavitation, it is necessary to change from the conventional foil shape with its characteristic localized pressure peak near its blunt leading edge. At high speeds, this causes a localized, intermittent formation and collapse of a vapor bubble which results in the severe flow disturbance and surface erosion. A sharp-edged foil will, on the other hand, produce a thin wedge-shaped vapor cavity which will be stable and not collapse until beyond the trailing edge if the foil surface does not pierce the cavity boundary. From structural considerations it is desirable to design the foil to nearly fill the cavity, and thus the characteristic shape of the supercavitating foil is a sharp leading-edge wedge. The effectiveness of this foil shape has been fully substantiated experimentally. It has also been demonstrated that for this foil shape to truly supercavitate, it must be operated at an optimum, low angle of attack to the stream direction.

In designing a controllable pitch, supercavitating marine propeller it is obviously desirable to have the blade sections of optimum foil shape and at optimum angle of attack for its operation at the maximum design speed of the vehicle. Although blade pitch is reduced as speed is reduced, the section angles of attack must increase above the optimum high speed value in order to produce enough lift to absorb engine power at these lower speeds. With an appreciable increase in angle of attack, the flow cannot make the turn around the sharp leading edge and flow separation occurs on the upper surface with attendant serious loss in performance.

Other design problems associated with the controllable pitch, supercavitating propeller stem from the poor structural characteristics of its sharp, wedge-shaped sections. The thin leading edge has low torsional stiffness, and for off-design conditions where non-optimum angles of attack result in large unsteady hydrodynamic forces, it is quite susceptible to flutter. Severe leading edge damage and distortion have been experienced on some experimental supercavitating propellers, due to this characteristic. Furthermore, the inherent blunt trailing edge of *relatively thick* shaped section is unfavorable from the standpoint of mass concentration in an area where it is structurally of little benefit in a controllable pitch type blade, and yet produces a large centrifugal twisting moment about the pitch change axis of the blade. This results in a requirement for large capacity in the pitch changing mechanism of the propeller and consequent weight penalties.

Figure 2:
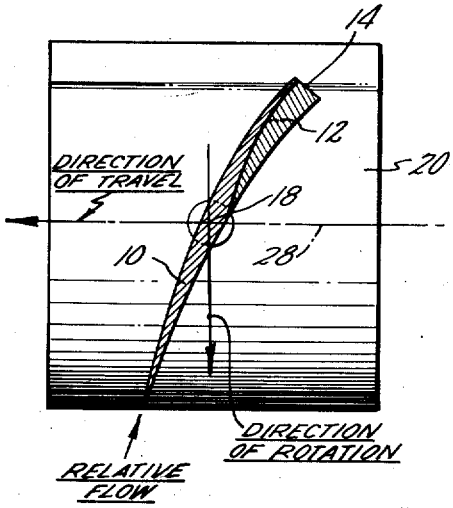
FIG. 2 is a view partly in section showing the relation of the main and auxiliary blades in high pitch position.
Figure 5:
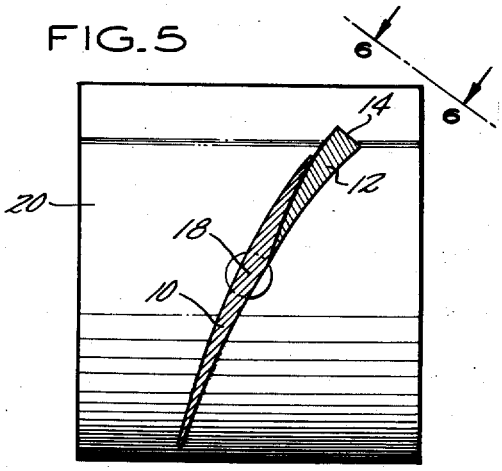
FIG. 5 is a side elevation similar to FIG. 1 showing a modified form of the adjustable blade.

The present invention is aimed at a practical solution to these design problems in a controllable pitch supercavitating marine propeller. This objective is achieved by *longitudinally* splitting the *outwardly extending* supercavitating blade into two elements as shown in the drawings. Element 10 becomes the controllable pitch portion of the blade and element 12 is maintained as a fixed pitch portion. FIG. 2 shows the two elements aligned for the design maximum speed condition where in conjunction with each other they form an optimum supercavitating blade section shape. The element 10 nests with and overlaps the element 12 which is arranged to nest with the trailing portion of the element 10. The trailing edge 14 of the composite blade is formed primarily of the blunt edge of the element 12 and to a minor extent by the relatively sharp trailing edge of the element 10. In one preferred embodiment the trailing edges of the two elements are substantially coextensive throughout the planform of the element 10. As is shown in FIG. 1, the fixed portion 12 has a [cord] *chord* of thirty to forty percent of the [cord] *chord* of the movable element 10 and extends from the trailing edge of the element 10 to a substantially radial straight line on the face side of the *radially extending* element 10 spaced from but comparatively adjacent to the pitch changing axis 18 of the movable element.

*Radially extending element* [Element] 12 is fixed on or secured to a hub 20 by any suitable means and may even be integral with the hub, if desired. The movable portion 10 is rotatably mounted in the hub 20 for pitch changing movement about a pitch changing axis 18 *extending outwardly of the hub 20, longitudinally of the element 10, adjacent the mid-chord of the blade and adjacent the blade centerline* in any suitable and well known manner. For purposes of illustration, it is shown as supported in a journal 22 in the propeller hub and held therein by a flange 24. It should be understood that this schematic showing is for purposes of illustration only and that any suitable well-known mounting may be used.

Any suitable and well-known mechanism may be used for changing the propeller pitch. For purposes of illustration and explanation, this mechanism is shown as a plunger 26 longitudinally movable along the axis 28 of rotation of the propeller hub 20. A pin 38 depending from one side of the flange 24 is received in a transverse slot 32 in the plunger 26 and serves to transform longitudinal movements of the plunger 26 into pitch changing movements of the element 10. The hub 20 is supported upon a shaft 34 which in turn is mounted in bearings, not shown, for rotatably supporting the propeller about the axis 28. The propeller may be driven by an engine 36 drivingly connected with the propeller shaft 34 by gears 38 and 40. The propeller pitch may be controlled by any suitable and well-known means such as a manual control or it may be controlled by a speed responsive governor 42 operatively connected with the plunger 26 by a rod 44. The governor may be of any well-known construction and obtain its speed signal directly from the shaft 34 or from the engine 36.

Although only one blade has been shown for simplicity in the drawings, it should be understood that two, three or any desired number of blades similar to the blade 10, 12 may be mounted in, or supported by, the hub 20.

As indicated above, FIG. 2 shows the elements 10, 12 nested in overlapping relation to form in effect the single supercavitating blade in the design maximum speed condition and having a cross-section of a typical supercavitating blade with its relatively sharp leading edge and the blunt trailing edge. The design maximum speed position is the highest pitch position attainable in the propeller and represents the optimum angle of attack for the blade sections at the selected high vehicle speed and the corresponding rotating speed of the propeller which is selected to provide the most favorable advance ratio and cavitation index at this design condition.

Figure 3:
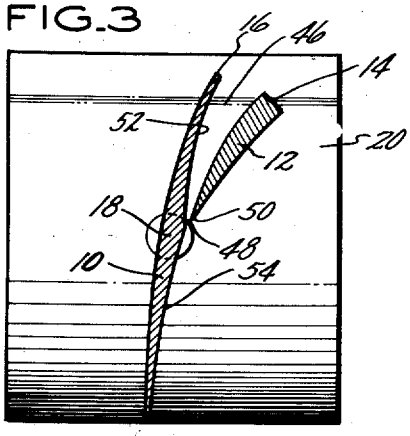
FIG. 3 is a view similar to FIG. 2 showing the blade in low pitch position.

At lower vehicle speeds such as when accelerating from a low speed, or from rest, it is necessary to reduce the propeller pitch in order that the power absorption requirement of the propeller does not exceed the maximum power capacity of the engine and load the engine down to below full output. This is accomplished either with manual adjustment of blade pitch to give full engine output at any vehicle speed, or wtih a governor which will automatically reduce pitch, as vehicle speed is reduced, to maintain a set engine speed at full power. As shown in FIG. 3, as the element 10 turns on its pitch changing axis 18 to reduce the propeller pitch it moves away from the fixed element 12 and leaves a divergent slot 46 between the elements having an opening 48 on the face side of the blade. The upper or camber side 53 of the element 12 is given a shape extending from the relatively sharp leading edge of the element 12 which will be generally convex and which, in conjunction with the complementary face side 52 of the element 10 (generally concave in shape), forms a curved divergent slot for maximum turning of the flow in order to achieve maximum lift. The curvature of the two complementary surfaces 52 and 53 need not be identical, but will be selected to provide the most favorable flow conditions for the low pitch positions of the specific application, and with the sole limitation that this will not interfere with the attainment of the desired contour of the face side of the blade when in the design maximum speed position. The element 12, being arranged at a favorable angle of attack because of the flow directing effect of the face surface 54 of the element 10, acts as a high lift device to increase the thrust and the performance of the propeller at the lower forward speeds of the vehicle. The divergent slot acts in a manner similar to that in a slotted flap construction and assists in maintaining flow with a favorable pressure gradient over the camber face of the element 12 and assists in preventing separation of flow on its camber surface. As the vehicle speed increases and the load on the propeller decreases, due to the tendency to decrease the angle of attack of the blade sections, the governor will increase the propeller pitch on element 10 in order to maintain the desired engine speed, until the design vehicle maximum speed is obtained. The vehicle will thus be brought from its rest or slow speed condition to the design cruise condition without encountering adverse angles of attack on the blade sections with accompanying flow disturbance and loss in performance.

Figure 4:
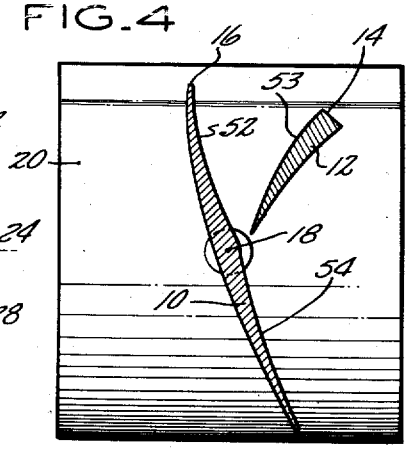
FIG. 4 is a section similar to FIG. 2 showing the blade in reverse pitch position.

It is often desirable to obtain reverse thrust on a marine propeller and this is quite often done by rotating the fixed pitch type propeller in a reverse direction. This might be done by reversing the engine rotation or providing a reversing gear system, either of which represents added complexity and weight penalty. With the controllable type propeller described herein it is possible to turn the movable element 10 to a negative pitch angle as shown in FIG. 4 and this may be done by movement of the plunger 26 either manually or by suitable governor control mechanism as is well-known in the art. The propeller element 10 would be turned to the negative angle as shown by FIG. 4 and would largely shield the fixed element 12 so that its effect in trying to drive the vehicle forward would be largely nullified, whereas element 10 would produce the normally large magnitude of reverse thrust of a conventional blade.

Figure 6:
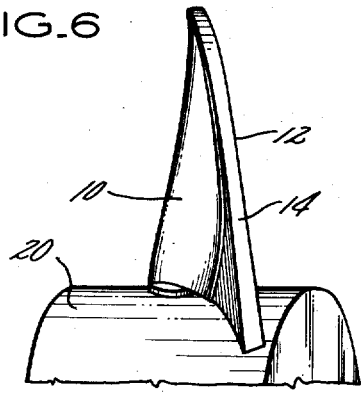
FIG. 6 is a view similar to FIG. 2 showing a section through the modified portion of the blade.

As indicated above, by nesting the two elements it is possible to provide a comparatively thin trailing edge 16 for the movable element 10. This would make the trailing edge considerably lighter over what it would be if it had to include all the metal in the blunt trailing edge 14 of the element 12. This is of particular advantage as far as the pitch changing mechanism is concerned. Because of the well-known action of blade mass disposed at appreciable distance from its pitch changing axis there is a tendency to reduce the propeller pitch by the action of a force which may at times be considerable. This is known as the centrifugal twisting moment and if large requires correspondingly large forces in the pitch changing mechanism. The maintaining of a blunt trailing edge on element 12 presents no problem since this is a fixed pitch element and thus does not affect the centrifugal twisting moment characteristics of the element 10. As shown in FIG. 6, it may be found advantageous to cut back the blade width of the element 10 adjacent the hub thus further reducing the centrifugal twisting moment and still maintaining the effective hydrodynamic shape in conjunction with the element 12 while allowing the camber face of the element 12 to form a continuation of the camber face of the element 10 adjacent the hub. The fixed trailing edge portion of element 12 provides it with adequate structural strength and the shank portion 23 of the movable element 10 can be made large enough to provide the element 10 with adequate structural strength.

*Blunt trailing edge as used in this specification means the trailing portion of the blade which may terminate as a surface of a plane, round or other configuration and is not limited to a single line as defining an edge.*

It should be understood that it is not desired to limit the invention to the exact details of construction and operation herein shown and described for various modifications within the scope of the claims may occur to persons skilled in the art. Having now particularly described and ascertained the nature of this invention and in what manner the same is to be performed, I claim and desire to secure by Letters Patent:

1. In a supercavitating marine propeller having radially extending blades, a hub, each blade comprising a main blade portion, having a sharp leading and a sharp trailing edge, pivotally mounted in said hub for pitch changing movements, a minor blade portion fixed on said hub and having a sharp leading edge and a blunt trailing edge and nesting with said main blade portion in the high pitch position to provide a composite blade having a sharp leading edge and a blunt trailing edge and providing separate blade portions with a slot between the portions in lower pitch positions.

2. In a supercavitating marine propeller, a radially extending blade having a sharp leading edge and a blunt trailing edge, said blade formed of a radially pivoted section and a fixed section, said fixed section having a sharp leading edge and a blunt trailing edge forming substantially the entire trailing edge of said blade and extending less than half the chord width of said blade from said blade trailing edge toward the pivotal axis of said radially pivoted section.

3. In a supercavitating propeller having a blade with a design condition producing substantially stable cavitation over the chordwise length of the blade, means maintaining favorable lift/drag relations at off-design conditions comprising means reducing the pitch of a portion of the blade including substantially the entire camber surface, and means maintaining a portion of the blade including the rear portion of the face of the blade in fixed position, to receive fluid directed by the remainder of the face of said blade, and form a diverging slot between the two blade portions.

4. A blade as claimed in claim 3 in which the pitch reducing blade portion has its major thickness adjacent the longitudinal center line and tapers toward the leading and trailing edges and the fixed portion has its major thickness at the trailing edge.

5. A blade as claimed in claim 3 in which the two blade portions overlap and nest to form a single blade section in the high pitch position of the blade.

6. In a supercavitating propeller, a hub, a plurality of blades radiating from said hub, each blade comprising a rear section formed integral with said hub, and a movable section extending forward of and overlapping said integral section and pivotally supported by said hub on an axis forward of said integral section.

7. In a marine propeller, a hub, blades radiating from said hub, each blade designed to have a stable cavitating layer at design conditions on its camber surface, means to reduce the blade pitch to prevent serious flow disturbance at speeds less than the design speed and a high lift device associated with said blade comprising a fixed blade section fixed with respect to said hub and nesting with said blade at design conditions, and forming a diverging slot with the trailing portion of the face side of said blade at said reduced pitch.

8. In a supercavitating marine propeller, a hub, blades radiating from said hub, each blade comprising a controllable pitch portion and a fixed portion having a chord less than half the chord of the controllable portion and having a trailing edge substantially coextensive in planform with the trailing edge of the controllable portion and nesting with said controllable portion in the high pitch position to form essentially a unitary blade and separated from said controllable portion by a diverging slot at lower pitch positions, said fixed portion having a relatively sharp leading edge and a relatively thick trailing edge.

9. In a supercavitating marine propeller, a hub, blades radiating from said hub, each blade comprising a main blade portion pivotally mounted in said hub on a pivotal axis adjacent the blade center line for pitch changing movements and a fixed auxiliary blade portion supported by said hub, nesting with the face side of, and extending forward from the trailing edge of, said main portion for less than half the chord of the main portion, to a position [downstream] *rearward* of the pivotal axis of said main portion.

10. In a supercavitating marine propeller as claimed in claim 9, an auxiliary blade portion having a chord 30% to 40% of the chord of the main blade portion.

11. A marine propeller as claimed in claim 7 including means responsive to the speed of the propeller for controlling the pitch of the propeller.

12. In a supercavitating marine propeller, a hub, blades radiating from said hub, each blade having a sharp leading edge portion and a blunt trailing edge portion and having an optimum pitch angle and shape for design speed conditions, each blade comprising an adjustable portion extending the full chord of the blade and a fixed portion supported by the hub and extending less than half of the chord of the blade from the trailing edge of the blade, on the face side, means for moving said adjustable portion in a pitch reducing direction relative to the hub and the fixed portion to reduce the pitch of the movable portion, and open up a divergent slot between said portions, said fixed portion having a sharp leading edge and a shape to present a blade section to flow directed by the face of said movable portion in its reduced pitch position to provide a high lift device.

13. In a supercavitating propeller blade having a movable portion extending the entire chord width of the blade at the outer section but tapering inward to less than the entire chord width of the blade at the inner section, a fixed portion having a camber side nesting with the face side of the trailing section of the movable portion and having a sharp leading edge and a blunt trailing edge extending the entire length of the blade trailing edge, said camber side forming a supercavitating blade section extension of said movable section in the inner section of the blade.

14. High lift mechanism for a supercavitating propeller comprising a blade having a movable portion forming substantially the entire camber face of the blade, a fixed portion nesting with the face of said movable portion and forming a portion of the trailing section of the face of the blade when the two portions are nested, and forming a high lift device for said blade when the movable portion is moved away from nesting position.

15. Means for improving the performance of an adjustable pitch, supercavitating propeller comprising a blade having a movable portion pivoted on a pitch changing axis for pitch changing movement and forming substantially the entire camber face of the blade, and a fixed portion nesting with the trailing section of the face side of said movable portion and forming a minor portion of the face of said blade, said movable portion trailing section movable on its pitch changing axis, in a pitch reducing direction, away from said fixed portion, to provide a high lift structure with the fixed section having a shape forming a diverging slot and a high lift member with said movable section.

16. A hub, an adjustable pitch supercavitating propeller blade pivotally supported by said hub and having a split trailing section, said split section comprising a flap section forming a portion of the face of said blade and fixed with respect to said hub and having a sharp leading edge and a blunt trailing edge and having a chord width less than half the blade chord width, the remainder of said blade pivoted to move toward and away from said flap section in pitch changing movements to open and close a diverging slot opening on the face side of said blade and discharging between the trailing edge of said blade and said flap section.

17. A propeller as claimed in claim 9 in which the maximum blade thickness of both the blade and the auxiliary blade portion at their respective trailing edges.

*18. In a variable camber, supercavitating marine propeller, an outwardly extending blade having a sharp leading edge and a blunt trailing edge portion, said blade formed of a longitudinal section pivoted on an axis extending longitudinally of the blade and a fixed portion, said fixed portion having a leading edge and a blunt trailing edge portion forming substantially the entire trailing edge portion of said blade and extending from the blade trailing edge to adjacent said axis of said pivoted section.*

*19. In a supercavitating marine propeller, an outwardly extending blade having a sharp leading edge and a blunt trailing edge portion, said blade formed of a forward section pivoted on an axis extending longitudinally of the blade adjacent the mid chord of the blade, and a fixed rear section, said pivoted section including the blade leading edge, said fixed section having an outwardly extending leading edge positioned adjacent the pivotal axis of said radially pivoted section, and a blunt relatively thick trailing portion forming substantially the entire trailing edge portion of said blade, said fixed section extending from said blade trailing edge to adjacent the pivotal axis of said pivoted section.*

*20. In a variable camber superchvitating propeller, a hub, a plurality of blades extending outwardly from said hub, each blade comprising a rear section fixed with respect to said hub, and a movable section extending forward of and nesting with said rear section and pivotally supported by said hub on an axis extending longitudinally of said blade adjacent the mid chord portion of said blade.*

*21. In a variable camber supercavitating propeller, a hub, a plurality of blades radiating from said hub, each blade increasing in thickness from the leading edge to the trailing portion comprising, a movable forward section and a rear section, said movable section pivotally supported on an axis extending outwardly from said hub, extending forward of said axis and having a sharp leading edge forming the leading edge of the blade, said rear section supported on said hub and extending rearward from adjacent said axis and having a blunt trailing edge portion forming the trailing edge portion of said blade.*

*22. A propeller as claimed in claim 21 in which said pivotally supported movable forward section forms more than half of the blade.*

*23. A propeller as claimed in claim 21 in which said rear section nests with said forward section in a selected position of said forward section to form blades with substantially continuous chordwise surfaces from the standpoint of hydrodynamic flow across each blade.*

*24. A propeller as claimed in claim 21 in which said axis is positioned adjacent the mid chord of said blade.*

*25. A supercavitating marine propeller comprising a blade support having an axis of rotation. A blade extending outwardly from said axis, said blade comprising a rear section and a forward section, said rear section fixed with respect to said support and having a blunt trailing edge portion forming the trailing edge portion of said blade, said forward section mounted for pitch changing movement on a pitch changing axis fixed with respect to said support and extending outwardly from said axis of rotation and located adjacent the leading edge of said fixed section, said forward section extending forward of said pitch changing axis to a sharp leading edge forming the leading edge of said blade.*

References Cited by the Examiner

The following references, cited by the Examiner, are of record in the patented file of this patent or the original patent.

UNITED STATES PATENTS

| | | | |
|---|---|---|---|
| 1,344,496 | 6/20 | Flattum | 170—165 |
| 2,145,805 | 1/39 | Ring | 170—160.46 |
| 2,982,361 | 12/58 | Rosen | 170—135.24 |
| 3,065,723 | 11/62 | Tulin | 170—159 X |
| 3,085,537 | 4/63 | Headrick et al. | 170—159 |

FOREIGN PATENTS

| | | |
|---|---|---|
| 464,542 | 8/28 | Germany. |
| 332,088 | 7/30 | Great Britain. |

JULIUS E. WEST, *Primary Examiner.*